Figure 1:
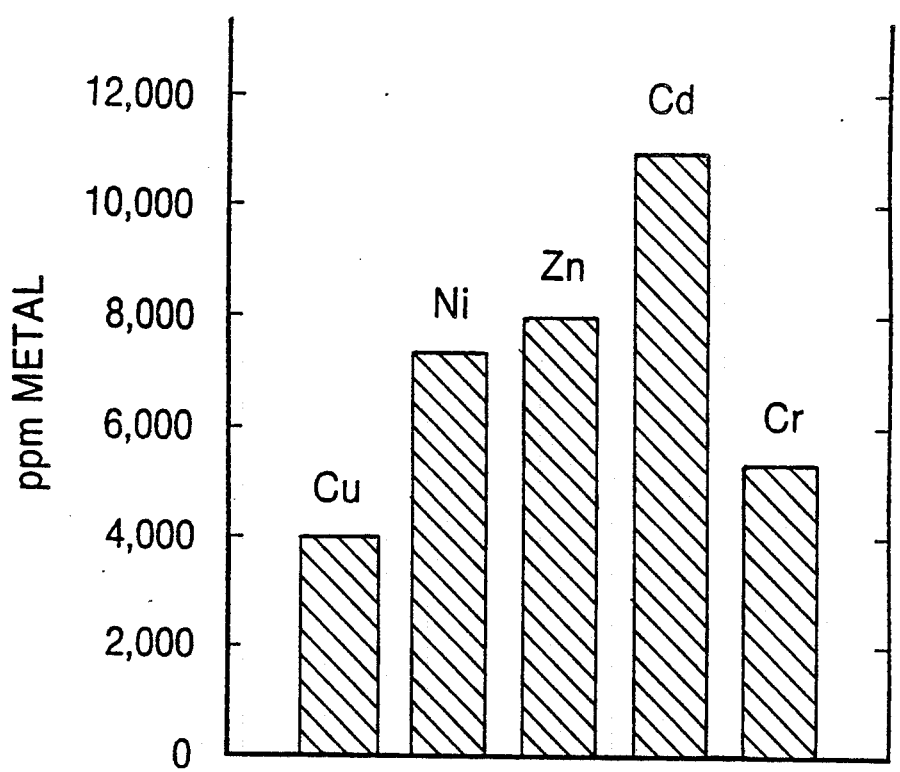

United States Patent [19]

Tel-Or et al.

[11] Patent Number: 5,000,852
[45] Date of Patent: Mar. 19, 1991

[54] REMOVAL OF METAL IONS FROM SOLUTIONS

[75] Inventors: Elisha Tel-Or, Kfar Bilu; Mordechai Sela, Haifa, both of Israel

[73] Assignee: Vissum Research Development Company of the Hebrew University of Jerusalem, Jerusalem, Israel

[21] Appl. No.: 324,684

[22] Filed: Mar. 17, 1989

[30] Foreign Application Priority Data

Mar. 17, 1988 [IL] Israel ............................................. 85771

[51] Int. Cl.[5] .............................. C02F 3/32; C02F 1/62
[52] U.S. Cl. .................................. 210/602; 210/688; 210/912
[58] Field of Search .......... 210/602, 631, 688, 912–914

[56] References Cited

U.S. PATENT DOCUMENTS 4,169,050 9/1979 Serfling et al. .................. 210/602
4,456,532 6/1984 Leslie et al. .................. 210/611 X Primary Examiner—Tom Wyse
Attorney, Agent, or Firm—Fleit, Jacobson, Cohn, Price, Holman & Stern

[57] ABSTRACT

A process for the removal of heavy metal ions from water and means for effecting such removal. The process is based on the growth of the water fern Azolla in solutions of water which contain such ions. Heavy metal ions can be efficiently removed from aqueous solutions by passing these through biomass of Azolla in comminuted form. Such columns also are part of the present invention.

6 Claims, 3 Drawing Sheets

HEAVY METALS INCORPORATION BY *Azolla* AND REMOVAL FROM GROWTH MEDIUM

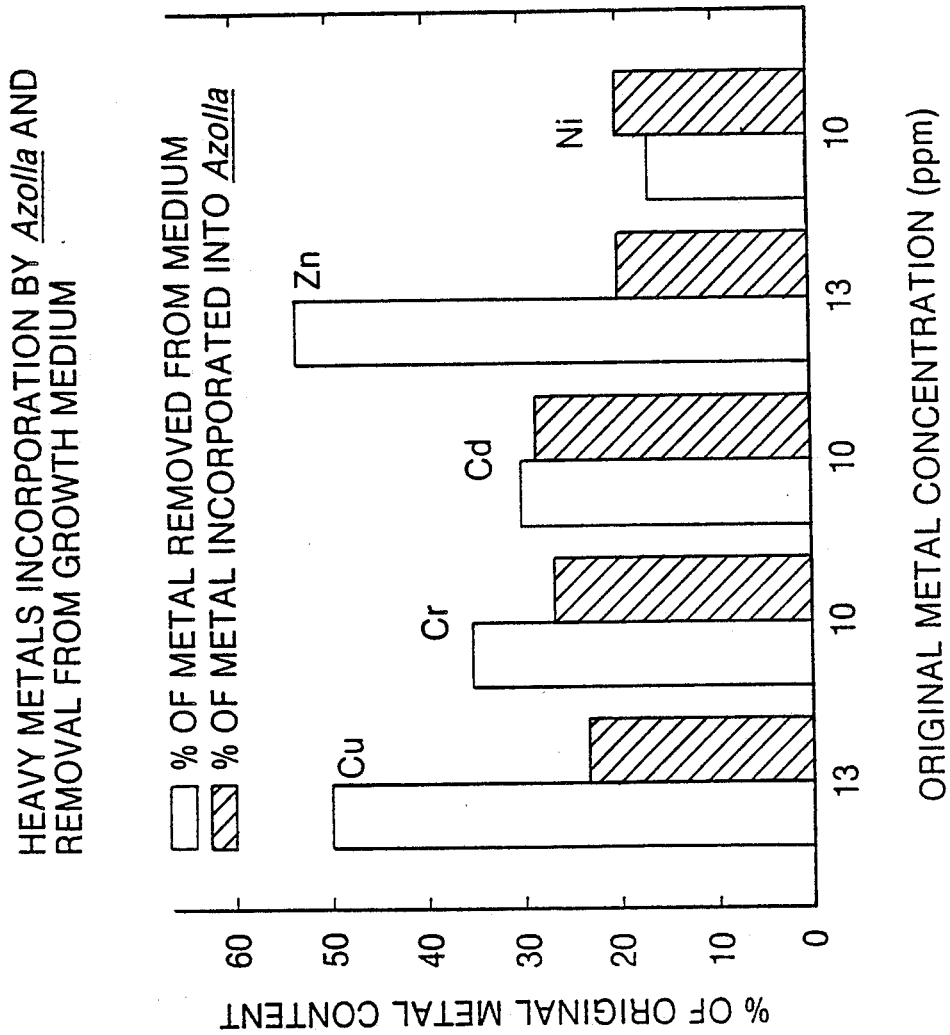

REMOVAL OF METAL IONS FROM SOLUTIONS

FIELD OF THE INVENTION

The invention relates to means for the removal of metal ions from aqueous systems. There are provided means and a process for the removal of such metal ions by means of certain plants or plant products.

BACKGROUND OF THE INVENTION

The removal of certain metal ion contaminants from aqueous media is one of the main problems in many types of endeavors, such as various chemical industries, in plants for the production of atomic energy, etc. Various effluents have to be cleaned, at least partially, before they can be discarded into open water reservoirs, rivers or the like, and the aquifers. Various metal ions must be removed before water can be recycled for various uses. Hitherto a wide variety of means have been resorted to for this purpose. The present invention provides convenient and inexpensive means and processes for the reduction of the metal content of various aqueous media.

SUMMARY OF THE INVENTION

The floating water fern Azolla is a very efficient crop in fresh and also in polluted water. Azolla is a highly efficient agent in the removal of a variety of metal ions from aqueous solutions thereof. Comminuted compacted Azolla can be used in various forms, such as columns, to remove metal ions from aqueous solutions contacted therewith.

Experiments have shown that metal ions belonging to transition element Groups of the Periodic Table, and especially metal ions such as copper, zinc, chromium, nickel, cadmium, uranium silver and titanium are taken up in substantial quantities by Azolla. The Azolla water fern growing in aqueous media containing such metal ions, incorporates metal ions which are concentrated in the insoluble parts of the plants.

Metal ions of the type defined above can be removed by cultivating Azolla in aqueous solutions containing such ions. This was tested in tanks containing such ions in a range of concentrations of from 1 ppm to about 30 ppm, and preferably from 5 ppm to 20 ppm of the metal ions. About 40 to 60 per cent of the initial quantity of metal ions present were taken up by the plants during a growth period of about 3 to 7 days and the metal content in the plant after such period was about 0.3 g to 1 g metal per 100 g Azolla (dry weight). This technology is applicable to the removal of metal ions from polluted effluents of industrial sewage and for the reclamation of polluted water. If the purification cycle is repeated, in each such cycle a reduction of metal content by a factor of 40 to 90 per cent can be attained depending on the metal ion. The process is also of value for the recovery of valuable metals from aqueous systems.

According to a further embodiment of the invention dried biomass of Azolla is used for adsorbing metal ions from aqueous solutions contacted therewith. Aqueous solutions containing such ions were passed through a column containing such biomass and the metal ions were adsorbed to the Azolla material. Percentages as high as about 97 to 99 per cent of the initial quantity of the metal ions could thus be removed from the aqueous systems. The Azolla biomass adsorbed the metal ions up to a certain saturation level, which is reached when the Azolla reaches a metal content of from about 3 to 5 g metal per 100 gram Azolla. (dry weight).

Azolla is a water fern belonging to the family Salvinaceae. The main type tested was *Azolla filiculoides* (var Abu Kabir) which is referred to in the following as *Azolla f.* There exists a variety of other species of Azolla, namely:

*Azolla pinnata, Azolla caroliniana, Azolla macrophyla, Azolla mexicana, Azolla nilotica*. All of these can potentially be used for the removal of metal ions from aqueous solutions.

*Azolla f.* is a floating fern and the metal ions are adsorbed via the rhizoid (rootlet) of the growing plant and are accumulated in the plant leaves. The Azolla plant is gradually poisoned by the metal ions when these reach too high a concentration. When Azolla is harvested after uptake of a maximum quantity of metal ions, about 80 per cent of the water content of the fresh fern can be mechanically removed, and these contain not more than about 1 to 1.5% of the accumulated metal content. The remainder of the metal remains bound in the biomass, and when this is burned, the metal or metals can be recovered. The combustion can probably be sustained by the plant material and thus no external energy is required for the combustion process.

The doubling time of Azolla biomass in summer is from 4 to 10 days. During this period of time the plant takes up the possible percentage of metal ions and reaches a maximum content of metal ions. In systems such as aqueous solutions of uranyl phosphate, the uranyl content in the solution can be reduced from about 20 ppm to about 3 ppm due to removal by Azolla. Azolla biomass can be produced under various growth conditions, and crops of the order of a few tons dry weight can be produced per year per 1000 m$^2$. In a similar manner plutonium compounds can be removed from aqueous solutions containing same. Also gold, in its various soluble forms can be removed and retrieved.

This can be used for removal and recovery of metal ions from aqueous solutions, to detoxify industrial effluents, and especially to reduce substantially the initial high concentration of metal ions in such solution.

Azolla can also be cultivated in brackish water of up to about 3000 ppm NaCl. Azolla can be cultivated in up to 10 mM ammonium chloride and also in high concentrations of nitrates or phosphates.

Table 1 demonstrates the effects of salinity on growth of Azolla.

Table 2 demonstrates the uptake of heavy metals by Azolla from two culture media.

FIG. 1 demonstrates the accumulation of some heavy metals in Azolla.

Figure 2:
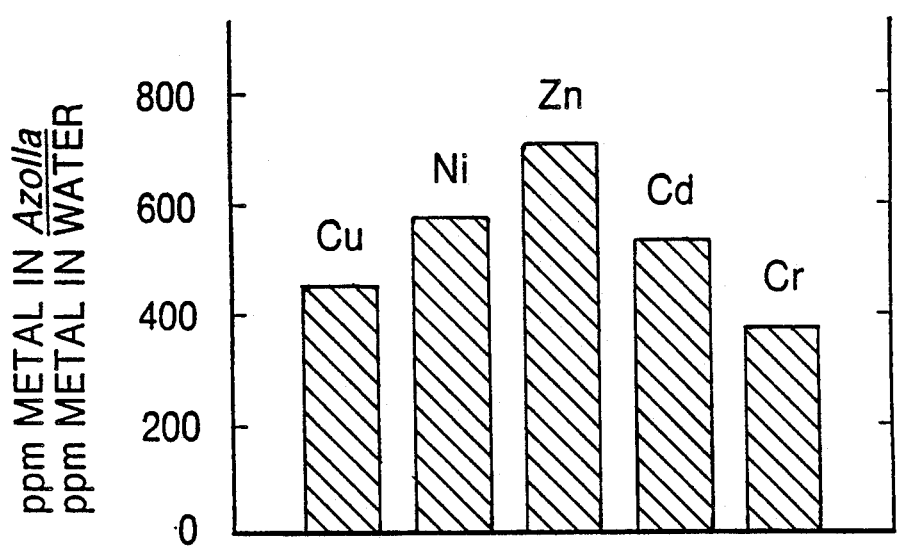

FIG. 2 demonstrates the efficiency of metal concentration in Azolla.

FIG. 3 demonstrates the incorporation of heavy metals by Azolla and the removal of these from the growth medium.

When Azolla is dried, there remains about 7 weight-per cent dry material. This is crumbled to give a powder which is used to fill a column. Experiments have shown an uptake of up to about 3 weight-per cent of metals calculated on the dry material. At saturation the column stops adsorbing the metal ions in a quite abrupt manner. The data in Table 3 and 3' illustrate the removal of metal ions from aqueous solutions by growing Azolla, while Table 4 and 4' demonstrate the removal by columns of Azolla dried biomass.

TABLE 1
Effect of salinity on growth and composition of Azolla f.

| | | NaCl added | | |
|---|---|---|---|---|
| | Control | 25 mM (1500 ppm) | 50 mM (3000 ppm) | 75 mM (4500 ppm) |
| G (doubling time) | 5.4 | 4.9 | 5.2 | 6.2 |
| Dry weight/Fresh weight (%) | 5.4 | 4.9 | 5.5 | 6.1 |
| $N_2$-fixation (% of control) | 100 | 93 | 92 | 51 |
| G | 6.7 | 5.7 | 6.2 | 6.7 |
| Soluble sugar (%) | 1.5 | 1.4 | 2.0 | 2.5 |
| $N_2$-fixation | 100 | 180 | 150 | 70 |

(First three data rows: One week; last three: Two weeks)

TABLE 2
Uptake of heavy metals in Azolla f.

| | Zn | | Ni | | Cd | | Cr | | Cu | |
|---|---|---|---|---|---|---|---|---|---|---|
| | I | II | I | II | I | II | I | II | I | II |
| Metal in medium (ppm) | 7.2 | 13.1 | 10.3 | 9.5 | 10.7 | 10.2 | 12.6 | 10 | 7.4 | 13 |
| Metal in Azolla (ppm) | 3106 | 3478 | 3214 | 2658 | 7749 | 3525 | 2533 | 2571 | 11200 | 4010 |
| Percent metal removed | 32 | 25 | 29 | 20 | 55 | 28 | 20 | 30 | | 29 |

The experiment was carried for four days in two dilutions of Hoagland growth medium H/40 (I) and H/8 (II). These results are representative of 5-10 experiments for each metal.

TABLE 3
REMOVAL OF METAL IONS FROM AQUEOUS SOLUTIONS BY GROWING AZOLLA

| Metal Ion | $Fe^{2+}$ | $Ag^+$ | $U^{2+}$ | $Ti^{3+}$ |
|---|---|---|---|---|
| Initial concentration (ppm) | 21 | 34 | 20 | 20 |
| Final concentration (ppm) | 15.3 | 29 | 3.05 | n.d. |
| percent metal removed | 27 | 12 | 84 | n.d. |
| percent metal content in Azolla (w/w) | 1.53 | 1.06 | 1 | 0.26 |

25 g fresh Azolla in 2 liters aqueous solution, grown for 7 days (n.d. = not determined).

TABLE 4
REMOVAL OF METAL IONS FROM AQUEOUS SOLUTIONS BY COLUMNS OF AZOLLA POWDER

| Metal Ion | $Cd^{2+}$ | $Zn^{2+}$ | $Ag^+$ |
|---|---|---|---|
| Initial concentration (ppm) | 800 | 216 | 1150 |
| Final concentration (ppm) | 0.176 | 0.86 | 4.56 |
| percent metal removed | 99.98 | 99.6 | 99.6 |

50 g dry weight Azolla in column, passage of 900 ml solution during about 5 minutes

TABLE 5
REMOVAL OF METAL IONS FROM AQUEOUS SOLUTIONS BY CULTIVATION OF AZOLLA

| Metal Ion | Concentration in Solution (ppm) | Content in Plant Material (mg/g) |
|---|---|---|
| Uranium | 20 | 10 |
| Uranium | 10 | 5 |
| Silver | 34 | 10.6 |
| Silver | 18 | 5.4 |
| Titanium | 20 | 2.6 |
| Iron | 1 | 0.5 |

Azolla cultures were grown during 7 days in 2 liters solution, uptake was by 25 g fresh weight of Azolla.

Azolla cultures were grown during 7 days in 2 liters solution, uptake was by 25 g fresh weight of Azolla.

TABLE 6
REMOVAL OF METAL IONS BY COLUMN OF AZOLLA POWDER FROM AQUEOUS SOLUTIONS

| Metal Ion | Metal Concentration in Solution (ppm) | Uptake by Column Material (g metal/100 g powder) |
|---|---|---|
| $Ag^+$ | 1150 | 3.2 |
| $Cd^{2+}$ | 1000 | 4.2 |
| $Ni^{2+}$ | 16000 | 2.7 |
| $Zn^{2+}$ | 17000 | 2.1 |
| $Cu^{2+}$ | 15500 | 3.9 |

A quantity of 60 ml of an aqueous solution containing $H(AuCl_4) \cdot H_2O$ (auric chloride) at a pH of 3.0 at a concentration of 200 ppm was contacted with 0.4 g Azolla in powder form and stirred for 25 minutes. After this period the powder was separated and analyzed. The Azolla powder contained a quantity of 19937 ppm, which was absorbed by the 0.4 g. The gold was in a large excess and thus this demonstrates the capacity of uptake by Azolla.

We claim:

1. A process for the removal of transition metal ions from aqueous solutions containing such ions which comprises growing the water fern Azolla, selected from the group consisting of *Azolla filiculoides, Azolla pinnata, Azolla caroliniana, Azolla macrophyla, Azolla mexicana* and *Azolla nilotica*, in such solutions until a substantial percentage of the initial metal ion content is taken up by the growing fern.

2. A process according to claim 1, where the initial metal ion concentration is from about 1 ppm to about 40 ppm.

3. A process according to claim 1, where the metal is recovered from the Azolla by water removal and subsequent combustion.

4. A process for the removal of metal ions from aqueous solutions by means of the water fern Azolla defined in claim 1, which comprises passing the aqueous metal ion solution via a column containing a biomass of Azolla.

5. A process according to claim 4, where the biomass consists of dry crumbled Azolla or Azolla powder.

6. A process according to claim 4, where the metal adsorbed by the column is recovered by combustion of the biomass and recovery of the metal from the residue.

* * * * *